Oct. 1, 1940.  C. R. ANDERSON  2,216,288
PIPE PERFORATING DEVICE
Filed April 26, 1938
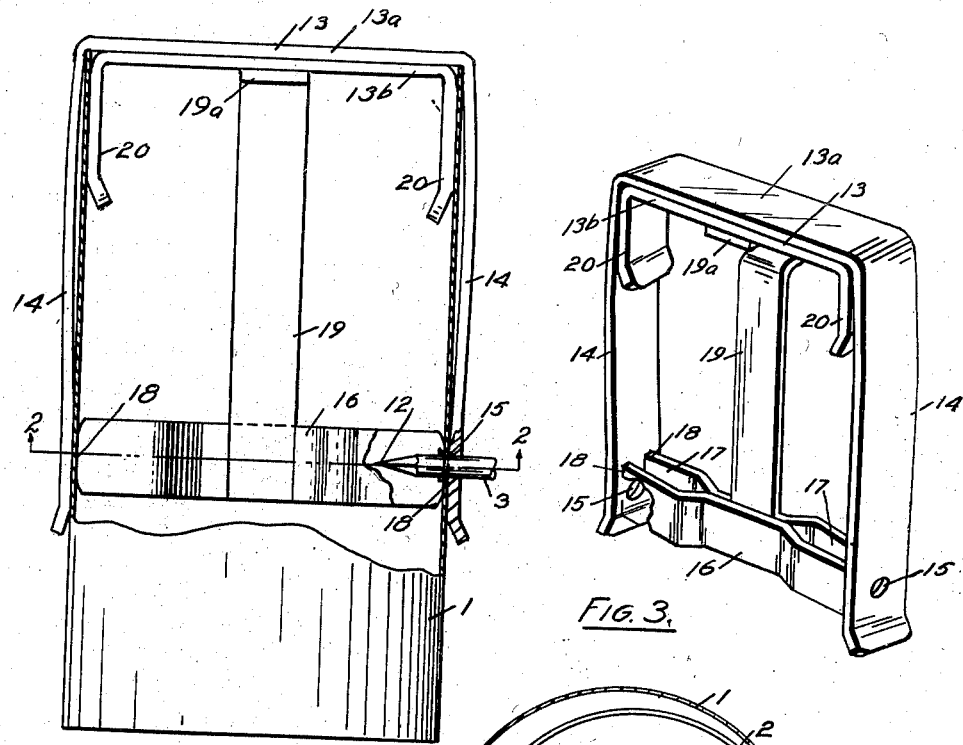
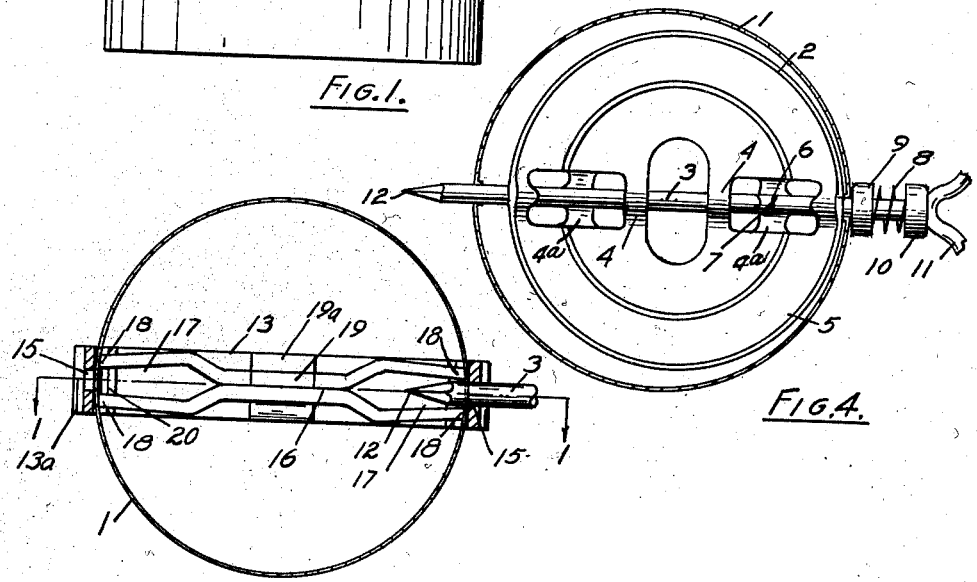
INVENTOR.
Carl R. Anderson
BY
ATTORNEYS.

Patented Oct. 1, 1940

2,216,288

UNITED STATES PATENT OFFICE 2,216,288

PIPE PERFORATING DEVICE

Carl R. Anderson, Erie, Pa., assignor to The Griswold Manufacturing Company, Erie, Pa., a corporation of Pennsylvania Application April 26, 1938, Serial No. 204,370

5 Claims. (Cl. 164—108)

This invention is designed to perforate pipes, particularly stove pipes, in order to receive a damper rod as the damper is installed. It is desirable in perforating such pipe that the perforations at the opposite sides of the pipe be both centered and also arranged in a plane at right angles to the axis of the pipe. It is also desirable in perforating the pipe to perforate it from the outside in order that whatever burr may be produced shall be inside the pipe. The present invention is designed to form perforations quickly, both centered and arranged in a plane at right angles to the pipe and to permit the formation of the burr on the inside of the pipe. Features and details of the invention will appear from the specification and claims.

A preferred embodiment of the invention is illustrated in the accompanying drawing as follows:

Fig. 1 shows an elevation partly in section, of a pipe with the perforating device in place.

Fig. 2 a section on the line 2—2 in Fig. 1.

Fig. 3 a perspective view of the device detached.

Fig. 4 a plan view of a perforated pipe with the damper in place therein.

1 marks the stove pipe; 2 a damper in place in the pipe; 3 a damper rod which passes through loops 4 and 4a in the damper 5. One of the loops 4a has a locking notch 6 adapted to receive a shoulder formed by a bend 7 in the rod. A spring 8 outside the pipe extends from a cup 9 seated on the pipe to a cup 10 seated on the rod handle. The spring tends to yieldingly hold the shoulder 7 in locking position. The rod is provided with a point 12 so that it may be used for perforating the pipe. The parts so far described are, or may be, of common construction.

A frame 13 extends across the top of the perforating device and is formed of two plates, 13a and 13b. The plate 13 is bent so as to form the fingers 14 which extend along the outer surface of the pipe when the device is in place. The fingers are provided with opposing perforations 15, these perforations being spaced from the frame 13 the distance from the end of the pipe at which it is commonly desired to perforate a pipe. The fingers preferable are slightly resilient and contact the outer face of the pipe at the perforations 15. A backing 16 is formed of two plates secured together, these plates being separated at their ends, forming contact surfaces 18 at separated points. The separated ends form openings 17 which register with the perforations 15. The backing is supported by posts 19 which is in the form of a plate secured to the backing 16 at its center and having a flange 19a at its upper end by means of which it is attached to the cross frame 13. Thus the cross frame and the backing and fingers form a comparatively rigid frame, maintaining their relation as the cross piece is inserted into a pipe bringing the fingers along the outside of the pipe. Fingers 20 preferably extend from the inner plate 13b and are adapted to engage the inner surface of the pipe when the frame is put in place. These, with the fingers 14, tend to guide the frame into place and to square it and center it with the pipe.

In use the frame is inserted in the pipe ordinarily to a position bringing the end of the pipe into contact with the plate 13a. The damper rod or some other tool is used to form the perforations, the point being inserted in the openings, first in one opening 15 and then the other to perforate the pipe. The backing prevents the springing or yielding of the pipe at the point of perforation and consequently a perforation can be readily established even in rather hard pipe metal, and in any case very much less effort is used than where the pipe is free to yield. The openings so formed are square to the pipe and approximately centered by reason of the fact that the fingers are spaced substantially the full width of the pipe and the separation of the backing at the ends gives a width of contact tending to center the frame.

What I claim as new is:

1. A pipe perforating device comprising a cross frame; pairs of fingers extending from the cross frame adapted to straddle the sides of the pipe and position the frame on the pipe, the outer fingers having diametrically opposite and normally unobstructed guide openings adapted to slidingly receive and guide a punch through the opening in the punching operation and a backing carried by the frame and insertable into a pipe in position to engage a pipe wall adjacent to the openings.

2. A pipe perforating device comprising a cross frame; pairs of fingers extending from the cross frame adapted to straddle and engage opposing faces of the pipe and position the frame on the pipe, the outer fingers having diametrically opposite and normally unobstructed guide openings adapted to slidingly receive and guide a punch through the opening in the punching operation and a backing carried by the frame and insertable into a pipe in position to engage a pipe wall adjacent to the openings, one finger of each pair being resilient to yieldingly press the fingers into engagement with the wall.

3. A pipe perforating device comprising a frame formed of a cross bar made up of two plates, each plate having a pair of axially extending fingers extending therefrom, the fingers of each pair being spaced apart to adapt them to straddle the side walls of a pipe, the outer fingers having diametrically opposite and normally unobstructed guide openings adapted to slidingly receive and guide a punch through the opening in the punching operation for punching openings through the pipe; and a backing carried by the frame and insertable into a pipe in position to engage a pipe wall adjacent to the openings.

4. A pipe perforating device comprising a frame insertable into and extending over a pipe, and including outer members having guide openings diametrically placed and centering on an inserted pipe, said openings and the space outwardly from and in radial alignment with the openings being normally unobstructed and adapted to slidingly receive and guide a punch through the openings for punching directly opposed and centered openings in an inserted pipe.

5. A pipe perforating device comprising a frame insertable into and extending over a pipe, and including outer members having guide openings diametrically placed and centering on an inserted pipe, said openings and the space outwardly from and in radial alignment with the openings being normally unobstructed and adapted to slidingly receive and guide a punch through the openings for punching directly opposed and centered openings in an inserted pipe, and backing members adapted to back a pipe wall adjacent to the guide openings when the frame is in place on the pipe.

CARL R. ANDERSON.